United States Patent
Huberman et al.

(10) Patent No.: US 11,428,533 B2
(45) Date of Patent: Aug. 30, 2022

(54) GENERATING MAGNETIC FINGERPRINT FOR MOBILE DEVICE INDOOR NAVIGATION

(71) Applicant: MAPSTED CORP., Mississauga (CA)

(72) Inventors: Sean Huberman, Guelph (CA); Alexander Kogan, Scarborough (CA)

(73) Assignee: MAPSTED CORP., Mississauga (CA)

( * ) Notice: Subject to any disclaimer, the term of this patent is extended or adjusted under 35 U.S.C. 154(b) by 412 days.

(21) Appl. No.: 16/503,554

(22) Filed: Jul. 4, 2019

(65) Prior Publication Data

US 2021/0003400 A1 Jan. 7, 2021

(51) Int. Cl.
*G01C 21/20* (2006.01)
*G06F 17/16* (2006.01)

(52) U.S. Cl.
CPC ........... *G01C 21/206* (2013.01); *G06F 17/16* (2013.01)

(58) Field of Classification Search
CPC .............................. G01C 21/206; G06F 17/16
See application file for complete search history.

(56) References Cited

U.S. PATENT DOCUMENTS

| | | | |
|---|---|---|---|
| 6,539,327 B1 | 3/2003 | Dassot et al. | |
| 9,170,112 B2 | 10/2015 | Mirov et al. | |
| 9,557,178 B2 | 1/2017 | Ghose et al. | |
| 2009/0043504 A1 | 2/2009 | Bandyopadhyay et al. | |
| 2013/0150076 A1 | 6/2013 | Kim et al. | |
| 2014/0021942 A1* | 1/2014 | Kim | G01B 7/003 324/207.11 |
| 2014/0180627 A1* | 6/2014 | Naguib | G01C 21/08 702/150 |
| 2014/0229103 A1* | 8/2014 | Mirov | G01C 21/08 701/525 |
| 2015/0018018 A1* | 1/2015 | Shen | H04W 4/04 455/457 |
| 2016/0011022 A1 | 1/2016 | Zheng et al. | |
| 2016/0379074 A1* | 12/2016 | Nielsen | G06K 9/3241 |
| 2017/0265041 A1 | 9/2017 | Mahasenan et al. | |
| 2020/0103477 A1* | 4/2020 | Berkovich | G01R 33/10 |

* cited by examiner

*Primary Examiner* — Tarun Sinha
*Assistant Examiner* — Lal C Mang

(57) ABSTRACT

A method and system of magnetic fingerprinting for mobile device indoor navigation and positioning. The method, executed in a processor of a server computing device, comprises generating a magnetic infrastructure profile of at least a portion of the indoor area; determining, in the processor, a magnetic field profile based on the magnetic infrastructure profile; and generating an association of magnetic field profile parameters associated with respective locations within the indoor area as the magnetic fingerprint map.

20 Claims, 3 Drawing Sheets

300

```
┌─────────────────────────────────────────────────────────────────┐
│ Generate a magnetic infrastructure profile of at least a portion of the │
│ indoor area                                                     │
│                                                             310 │
└─────────────────────────────────────────────────────────────────┘
                                  │
                                  ▼
┌─────────────────────────────────────────────────────────────────┐
│ Determine, in the processor, a magnetic field profile based on the │
│ magnetic infrastructure profile                                 │
│                                                             320 │
└─────────────────────────────────────────────────────────────────┘
                                  │
                                  ▼
┌─────────────────────────────────────────────────────────────────┐
│ Generate an association of magnetic field profile parameters    │
│ associated with respective locations within the indoor area as the │
│ magnetic fingerprint map                                        │
│                                                             330 │
└─────────────────────────────────────────────────────────────────┘
```

FIG. 3

GENERATING MAGNETIC FINGERPRINT FOR MOBILE DEVICE INDOOR NAVIGATION

TECHNICAL FIELD

The disclosure herein relates to the field of fingerprint data for mobile device indoor navigation and positioning.

BACKGROUND

Users of mobile devices are increasingly using and depending upon indoor positioning and navigation applications and features. Seamless, accurate and dependable indoor positioning can be difficult to achieve using satellite-based navigation systems when the latter becomes unavailable or sporadically available, such as within enclosed or partly enclosed urban infrastructure and buildings, including hospitals, shopping malls, airports, universities and industrial warehouses. To address this problem, indoor navigation solutions increasingly rely on sensors such as accelerometers, gyroscopes, and magnetometers which are commonly included in mobile phones and similar mobile devices. Magnetic field data, wireless communication signal data, ambient barometric data, and mobile device inertial data when applied in localizing a mobile device along a route traversed within indoor infrastructure typically requires time consuming, error-prone and expensive manual calibration efforts to generate and maintain a positioning fingerprint map, or fingerprint database, of the indoor area.

BRIEF DESCRIPTION OF THE DRAWINGS

FIG. 3 illustrates, in an example embodiment, a method of magnetic fingerprinting system for mobile device indoor navigation and positioning.

DETAILED DESCRIPTION

Figure 1:
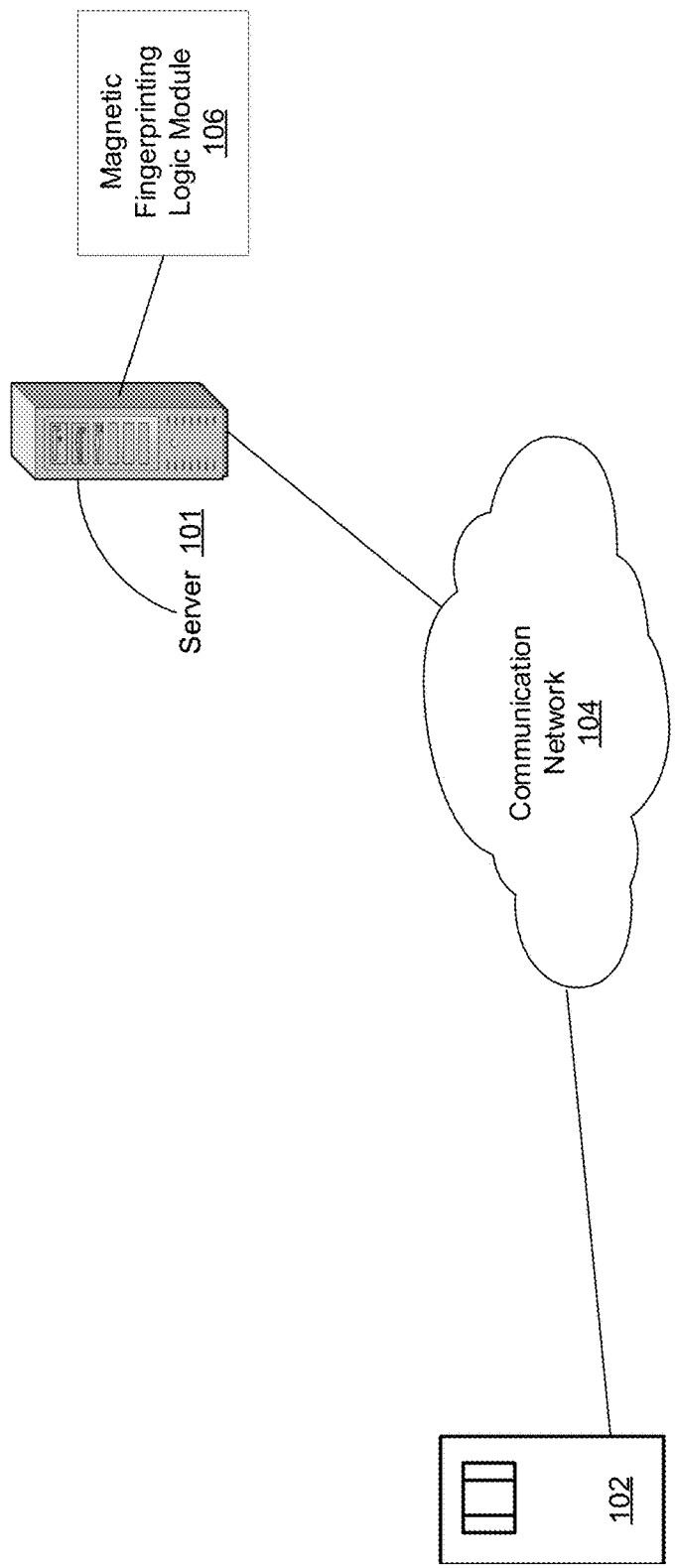
FIG. 1 illustrates, in an example embodiment, a magnetic fingerprinting system for mobile device indoor navigation and positioning.

Among other benefits, the disclosure herein provides for a location magnetic fingerprinting methodology and system that accounts for the presence of magnetic field anomalies created by structural features inherent to a given building. In embodiments, the method and system herein uses all three components of the measured magnetic field vectors to improve magnetic fingerprinting accuracy, and therefore overall accuracy for mobile device indoor navigation.

By applying a postulated mathematical model of magnetic characteristics, a resultant magnetic fingerprint representation that requires only minimal, if any, manual calibration may be generated in accordance with the postulated mathematical magnetic model ("magnetic model" as referred to herein).

The method and system discloses herein allows for magnetic parameter estimates of magnetic distortion areas that were not manually mapped. Additionally, after fingerprint mapping the area, it can be determined approximately how strong the estimated magnetic disturbances within the area are (i.e., how dense are the disturbed regions, are there many areas that appear to be unperturbed?). Knowledge of the density of magnetic regions within the area can influence whether the specific building is a good candidate for magnetic field calibration or not. In particular, if the anticipated magnetic spread is not significant, then a given building may not benefit from the more intensive magnetic calibration and processing.

Provided is a method of a method and system of magnetic fingerprinting for mobile device indoor navigation and positioning. The method, executed in a processor of a server computing device, comprises generating a magnetic infrastructure profile of at least a portion of the indoor area; determining, in the processor, a magnetic field profile based on the magnetic infrastructure profile; and generating an association of magnetic field profile parameters associated with respective locations within the indoor area as the magnetic fingerprint map.

Also provided is a server computing system for magnetic fingerprinting associated with mobile device indoor navigation and positioning. The server computing system comprises a processor and a memory. The memory includes instructions executable in the processor to generate a magnetic infrastructure profile of at least a portion of the indoor area; determine, in the processor, a magnetic field profile based on the magnetic infrastructure profile; and generate an association of magnetic field profile parameters associated with respective locations within the indoor area as the magnetic fingerprint map.

The terms localize, or localization, as used herein refer to determining a unique coordinate position of the mobile device at a specific location along a route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building or multi-level building, for example. In other embodiments, the (x, y, z) coordinates may be expressed either in a local reference frame specific to the mobile device, or in accordance with a global coordinate reference frame.

The indoor area may be any one or a combination of a manufacturing facility, a shopping mall, a warehouse, an airport facility, a hospital facility, a university campus facility or any at least partially enclosed building.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). An embedded device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, magnetic fingerprinting system 100 for mobile device indoor navigation and positioning, including mobile device 102. Mobile device 102 may include a processor, memory and associated circuitry to accomplish any one or more of telephony, data communication, and data computing. Mobile device 102 may be in communication with server computing device via communication network 104. In other variations, mobile device 102 may be connected within a computer network communication system 104, including the internet or other wide area network, to remote server computing device 101 that stores, in a fingerprint database, the fingerprint data of the pedestrian area, the latter being communicatively accessible to mobile device 102 for download of the fingerprint data.

Mobile device 102 may include magnetic characteristics sensor functionality by way of one or more magnetometer devices, in addition to inertial sensors such as an accelerometer and a gyroscope, barometric or other ambient pressure sensing functionality, humidity sensor, thermometer, and ambient lighting sensors such as to detect ambient lighting intensity and wireless signal strength sensors. Magnetic parameters sensed, whether directly or as calculated using one or more processors of mobile device 102 may include magnetic field strength, magnetic dip angle, and a magnetic field direction. The magnetic field in some embodiments may be detected, measured and rendered in accordance with separate x, y, and z-component vectors that constitute the magnetic field. Mobile device 102 may include location determination capability by way of a GPS module having a GPS receiver, and a communication interface for communicatively coupling to communication network 104, including by sending and receiving cellular data over data and voice channels.

A fingerprint data repository, or a portion(s) thereof, may be stored in server computing device 101 (also referred to herein as server 101) and made communicatively accessible to mobile device 102 via communication network 104. Server 101 may include magnetic fingerprinting logic module 106 comprised of instructions executable in a processor of server device 101, for use in conjunction with the fingerprint data repository that includes RSS fingerprint data. In some embodiments, it is contemplated that the fingerprint data repository, or any portions of data and processor-executable instructions constituting the fingerprint data repository, may be downloaded for storage, at least temporarily, within a memory of mobile device 102. In embodiments, the fingerprint map data stored in the fingerprint data repository further associates particular positions along pedestrian route of the manufacturing facility or indoor area with a particular combination of time-stamped fingerprint data, including gyroscope data, accelerometer data, wireless signal strength data, wireless connectivity data, magnetic data, barometric data, acoustic data, line-of-sight data, and ambient lighting data stored thereon.

The terms fingerprint and fingerprint data as used herein refer to time-correlated, time-stamped individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility in accordance with a particular time stamp of gathering the set of mobile sensor data by time correlating the mobile device gyroscope data, the mobile device accelerometer data, mobile device magnetometer data and any other applicable mobile device sensor data, for example. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in a fingerprint data repository of server 101. Server 101 may store respective fingerprint maps of various buildings and indoor areas. The respective building or indoor facility fingerprint maps, or any portions thereof, may be downloaded into a memory of mobile device 102 for use in conjunction with the pedestrian navigation software application executing thereon.

The magnetic characteristics of the earth's magnetic field may vary in different zones of a given building given the presence of steel structural elements, ferromagnetic objects and the electronic equipment typically contained there. Such elements perturb the earth's magnetic field which may provide the potential for distinguishing unique locations or positions inside the buildings. In general, a non-uniform indoor ambient magnetic field produces different magnetic observations depending on the path taken through it. Static objects or infrastructures inside buildings, such as steel structures, electric power systems and electronic and mechanical appliances, perturb the earth's magnetic field in a manner that establishes a profile of magnetic field values that constitute a map composed of magnetic field fingerprints. Certain elements inside buildings can distort or attenuate the relatively weak direction of the earth's magnetic field. Magnetic field perturbation as sensed or measured at a given location within the building may decrease rapidly as the distance from an interfering source increases. The size of the object responsible for the interference has a direct impact on the perturbation generated. More specifically, the larger the object, the greater the distance needed for the perturbation to decrease.

Figure 2:
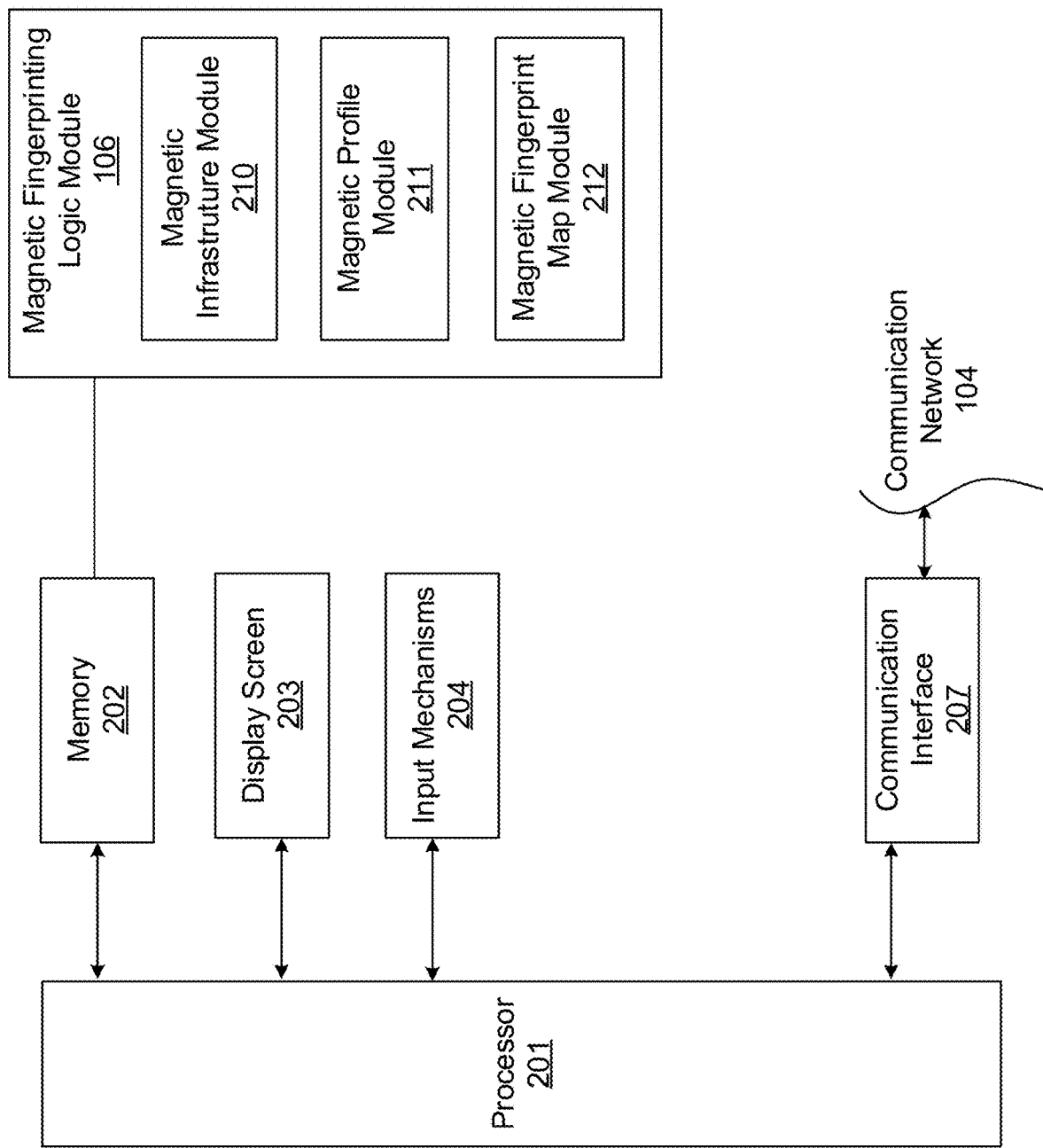
FIG. 2 illustrates, in one example embodiment, an architecture of a server computer implementing a magnetic fingerprinting system for mobile device indoor navigation and positioning.

FIG. 2 illustrates, in one example embodiment, an architecture of a server computer 101 implementing a magnetic fingerprinting system for mobile device indoor navigation and positioning. Server 101, in embodiment architecture 200, may be implemented on one or more server devices, and includes processor 201, memory 202 which may include a read-only memory (ROM) as well as a random access memory (RAM) or other dynamic storage device, display device 203, input mechanisms 204 and communication interface 207 communicatively coupled to communication network 104. Processor 201 is configured with software and/or other logic to perform one or more processes, steps and other functions described with implementations, such as described by FIGS. 1-3 herein. Processor 201 may process information and instructions stored in memory 202, such as provided by a random access memory (RAM) or other dynamic storage device, for storing information and instructions which are executable in processor 201. Memory 202 also may be used for storing temporary variables or other intermediate information during execution of instructions to be executed by processor 201. Memory 202 may also include the ROM or other static storage device for storing static information and instructions for processor 201; a storage device, such as a magnetic disk or optical disk, may be provided for storing information and instructions. Communication interface 207 enables server 101 to communicate with one or more communication networks 104 (e.g., a cellular network) through use of the both wired and wireless network links. Using the network link, server 101 can communicate with Mobile device 102.

Magnetic fingerprinting logic module 106 of server 101 may include executable instructions comprising sub-modules magnetic infrastructure module 210, magnetic profile module 211, and magnetic fingerprint map module 212

Processor 201 uses executable instructions of magnetic infrastructure module 210 to generate a magnetic infrastructure profile of at least a portion of the indoor area.

Processor 201 uses executable instructions stored in magnetic profile module 211 to determine a magnetic field profile based on the magnetic infrastructure profile.

Processor 201 uses executable instructions stored in magnetic fingerprint map module 212 to generate an association of magnetic field profile parameters associated with respective locations within the indoor area as the magnetic fingerprint map.

Methodology

FIG. 3 illustrates, in an example embodiment, method 300 of magnetic fingerprinting for mobile device indoor navigation and positioning. In describing examples of FIG. 3, reference is made to the examples of FIGS. 1-2 for purposes of illustrating suitable components or elements for performing a step or sub-step being described.

An assumption, in an embodiment of the present invention, is that the dominant source of indoor magnetic field deviations is caused by the magnetization of lengthy ferromagnetic elements (LFME), for example, steel beams, reinforcement rods in concrete walls/slabs, pipes, support columns, etc. In particular, an architectural floorplan provides a mapping of the locations of walls, doors, support columns, etc. As such, by applying mathematical models directly to the floorplan, an estimate of the inferred magnetic field can be developed.

More specifically, a single LFME gives off a magnetic field to its surrounding space. The magnetic field can be approximated by that of two single magnetic changes placed at both ends of the LFME opposite in sign but equal in magnitude. In particular, as the rod gets longer, the strength of the "side" magnetic fields gets weaker. Hence, for very long rods, it can be well-approximated by two separate magnetic charges on either end.

Different indoor objects can give off different magnetic effects. Some examples include: walls with iron rods, support beams, elevators, escalators, metal detectors (e.g., at entrances of stores in shopping centre). Hence, the magnetic charge, M, will be different depending on what type of object it is.

Based on the floor plan, we can identify a set of lines or polygons (e.g., identify a polygon as a room with walls or as an elevator). Classification of these elements can be based on manual labeling or utilizing an imagine processing technique (e.g., Support Vector Machines (SVM), Speeded-Up Robust Features (SURF), or Histograms of Orientated Gradients (HOG)).

Once each potential source of magnetic interference is classified, magnetic potentials can be assigned to each type. For example, $M_1$ for walls, $M_2$ for elevators, $M_3$ for escalators, . . . .

Default values for $M_1$, $M_2$, $M_3$, . . . can be used initially. Then, in conjunction with some calibration, a self-learning process can be used to refine the initial values and adjust them based on the observed data. This can be done by solving an optimization problem which attempts to minimize the difference between the mathematical model and the observed measured data during the calibration. The result is an empirically derived model of the magnetic field in a given building.

Hence, by processing the floorplan to extract out key vertices/edges representative of walls containing LFMEs, the location of the approximate magnetic charges can be estimated as the vertices of the floorplan. In particular, areas where two LFMEs intersect while result in the effects of two or more magnetic charges, depending the number of edge intersections.

While it is not possible to accurately determine the magnitude of the magnetic charges due to unknown spacing/diameter of the reinforced steel rods and due to the magnetic permeability of ferromagnetic materials, the magnetization should be proportional to the length (L), cross-sectional area (S), and the angle ($\alpha$) that the LFME makes with the geomagnetic field (i.e., proportional to LS cos($\alpha$).

By georeferencing the floorplan, the geolocation of each line's endpoints (i.e., the vertices of the floorplan) can be determined, and hence, the angle that the LFME makes with the geomagnetic field can be estimated or approximated. Similarly, due to the georeferenced, the length of the LFME can be estimated or approximated.

The equations for the magnetic fields derive a vector (x,y,z) which represents the location (x,y) and the height (z) of the magnetic potential. Basically, the assumption is that the magnetic field created from a magnetic point charge is dissipated radially (getting weaker as you get further away). We can get a "magnetic strength" vector and direction from knowledge of the location of the magnetic point charge. When we look at the summation of all magnetic effects (i.e., each one has a direction and a magnitude), we can derive the "net" magnetic field at a particular point. If we consider the summation of the "z" component, that will be the magnetic fingerprint for the "vertical" magnetic field. Using the "x-y" components, we can estimate the horizontal component for the magnetic fingerprint. Using alternative approaches, the "x-y" component can be used to estimate the magnetic fingerprint in the "north" or "east" directions. This can also be used to estimate the expected direction of the magnetic field. This can be used in many different ways.

For example, in real-time, the current magnetic field captured by the phone (in local phone coordinates) can be converted into global coordinates using a rotation matrix (attitude tracker/orientation tracker). Then, we get the magnetic field strength in the (North, East, Down) directions. These values can be compared to the pre-estimated mathematical model to "update the values". The real-time (N, E, D) values may correspond to the summation of the estimated (x, y, z) from the mathematical model.

For the magnetic fingerprint map, we can keep track of many different reasonable things, depending on the embodiment. For example: the full vector (N, E, D). Or just the vertical component ("D"), or the vertical+horizontal (N-E). We can also look into the angle of the vector or the dip angle.

The magnetic field created by each magnetic charge, M, is radial and follows the inverse squares law. Specifically, it admits a magnetic potential of $P_0 = M/R$, where $R = \sqrt{x^2+y^2+y^2}$ is the distance between the magnetic charge and the observation point. Hence, the respective magnetic field:

$$\vec{F} = \nabla P_0 = M(x^2 + y^2 + z^2)^{-\frac{3}{2}} (\hat{x}, \hat{y}, \hat{z})^T$$

The LFMEs are typically vertical or horizontal and oriented parallel to the walls where their ends (i.e., point charges) tend to intersect in one of the following ways: wall-wall, wall-ceiling, wall-floor, or doorway contours. For simplicity, refer to all these line intersections as end lines. Assuming the LFMEs in a parallel bundle are equally magnetized, then every end line will carry a uniformly distributed magnetic charge. For practical indoor scenarios, the generated magnetic fields at end lines are expected to represent short distances (i.e., l<<L), where the generated magnetic field will be cylindrical, symmetric, and proportional to $l^{-1}$.

For illustrative purposes, suppose that the coordinate system is chosen so that the LFME has ends at $$\left(-\frac{L}{2}, 0, 0\right) \text{ and } \left(\frac{L}{2}, 0, 0\right).$$

Then, the magnetic potential at an arbitrary point (x,y,z) is given by:

$$P_0(x, y, z) = \int_{-\frac{L}{2}}^{\frac{L}{2}} \frac{M}{\sqrt{(x-l)^2 + y^2 + z^2}} dl = M \ln \left[ \frac{\sqrt{x^2 + y^2 + z^2 - Lx + \frac{L^2}{4}} - x + \frac{L}{2}}{\sqrt{x^2 + y^2 + z^2 + Lx + \frac{L^2}{4}} - x - \frac{L}{2}} \right]$$

Hence, the magnetic potential is axially symmetric with respect to the X-axis.

The field strength $\vec{F} = \nabla P_0$. By applying the following definitions: $R = \sqrt{x^2+y^2+z^2}$, $V_\pm = \sqrt{R^2 \pm Ly + L^2/4}$, $W_\pm = \sqrt{R^2 \pm Lz + L^2/4}$, The field strength can be expressed explicitly in the form:

$$F_x = 2M \left( \frac{1}{U_+} - \frac{1}{U_-} \right)$$

$$F_y = My \frac{V_-^{-1} - \left(V_- + \frac{L}{2} - x\right) V_+^{-1}}{V_- + \frac{L}{2} - x}$$

$$F_z = Mz \frac{W_-^{-1} - \left(W_- + \frac{L}{2} - x\right) W_+^{-1}}{W_- + \frac{L}{2} - x}$$

Note that the most significant end-lines will be the "T" or "V" shape intersections. In particular, "X" shape intersections will generate a field which is decreasing with distance at a rate of $1/R^2$ or faster. As such, for simplicity, "X" shape intersections can be ignored. Note that door end-points still provide a magnetic point charge.

In a more generalized universal coordinate frame, X'=(x', y', z'), the n-th charged line is given by:

$$X = Q^{(n)} X^{(n)} + B^{(n)}$$

The solution to the field strength $\vec{F} = (F_x, F_y, F_z)$ will be identical to the above where the variables are now expressed:

$$R'(X^{(n)}) = \sqrt{R^2 + (B^{(n)})^2 + 2(X^{(n)} B^{(n)})}$$

$$U'_\pm(X^{(n)}) = \sqrt{(R')^2 \pm L(q_{11}^{(n)} x^{(n)} + q_{11}^{(n)} y^{(n)} + q_{11}^{(n)} z^{(n)} + b_1^{(n)}) + \frac{L^2}{4}}$$

$$V'_\pm(X^{(n)}) = \sqrt{(R')^2 \pm L(q_{21}^{(n)} x^{(n)} + q_{21}^{(n)} y^{(n)} + q_{21}^{(n)} z^{(n)} + b_2^{(n)}) + \frac{L^2}{4}}$$

$$W'_\pm(X^{(n)}) = \sqrt{(R')^2 \pm L(q_{31}^{(n)} x^{(n)} + q_{31}^{(n)} y^{(n)} + q_{31}^{(n)} z^{(n)} + b_3^{(n)}) + \frac{L^2}{4}}$$

Even with no or only a minimal validation or correction, the mathematical model can be utilized to identify "danger zones" in which the mathematical model predicts anticipated strong magnetic disturbances. Hence, in real-time, as the user begins to approach a "danger zone", due to the anticipation of strong magnetic field, the use of magnetometer-based heading corrections (e.g., compass direction) can be ignored or applied with a significantly reduced weight and instead rely heavily on the gyroscope/accelerometer-based data within those regions. As such, the sensor fusion can be optimized according to the user's current multi-floor geographic location by incorporating knowledge from the mathematical models.

Examples of method steps described herein relate to the use of server device 101 for implementing the techniques described.

At step 310, processor 201 executes instructions included in magnetic infrastructure module 210 to generate a magnetic infrastructure profile of at least a portion of the indoor area.

In some embodiments, the indoor area may be such as a manufacturing facility, a shopping mall, a warehouse, an airport facility, a hospital facility, a university campus facility or an at least partially enclosed building.

In some embodiments, the magnetic infrastructure profile comprises at least one of a wall, a support column, an elevator, a fixedly located electronic equipment, a support beam, a stairwell, an escalator, a ceiling, and an electro-mechanical power plant.

In one aspect, the magnetic infrastructure profile comprises at least one of a steel structural element and a ferro-magnetic structural element.

At step 320, processor 201 executes instructions included in module 211 to determine a magnetic field profile based on the magnetic infrastructure profile.

In some embodiments, the magnetic field profile is determined in accordance with a postulated mathematical magnetic model.

In an embodiment, the postulated mathematical magnetic model includes at least a lengthy ferromagnetic element (LFME).

In another embodiment, the magnetic field profile parameters comprise a magnetic field strength.

In other variations, the magnetic field parameters comprise a magnetic dip angle.

In some embodiments, the magnetic field parameters comprise at least one of an x, y, z magnetic field vector component.

In other variations, the magnetic field parameters comprise a magnetic direction.

At step 330, processor 201 of server 101 executes instructions included in module 212 to generate an association of magnetic field profile parameters associated with respective locations within the indoor area as the magnetic fingerprint map.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method, executed in a processor of a server computing device, of generating a magnetic fingerprint map of an indoor area, the method comprising:
    generating a magnetic infrastructure profile of at least a portion of the indoor area, wherein generating the magnetic infrastructure profile comprises identifying a set of polygons corresponding to potential magnetic field interference sources, based on a floorplan of the indoor area;
    determining, in the processor, a magnetic field profile based on the magnetic infrastructure profile, wherein the magnetic field profile is determined based on a postulated magnetic model, and wherein determining the magnetic field profile comprises:
    classifying each of the set of polygons, based on a magnetic potential of a type of magnetic field interference source corresponding to a polygon; and
    assigning, based on the type of the magnetic interference source, default initial values to magnetic field profile parameters of each of the set of polygons, the default initial values being based on the postulated magnetic model; and
    generating an association of the magnetic field profile parameters associated with respective locations within the indoor area as the magnetic fingerprint map.

2. The method of claim 1 wherein the magnetic infrastructure profile comprises at least one of a wall, a support column, an elevator, a fixedly located electronic equipment, a support beam, a stairwell, an escalator, a ceiling, and an electro-mechanical power plant.

3. The method of claim 1 wherein the magnetic infrastructure profile comprises at least one of a steel structural element and a ferro-magnetic structural element.

4. The method of claim 1 wherein the postulated mathematical magnetic model includes at least a lengthy ferromagnetic element (LFME).

5. The method of claim 1 wherein the magnetic field profile parameters comprise at least one of a magnetic field strength and a magnetic dip angle.

6. The method of claim 1 wherein the magnetic field parameters comprise at least one of an x, y, z magnetic field vector component.

7. The method of claim 5 wherein the magnetic field parameters comprise a magnetic direction.

8. The method of claim 1 wherein the indoor area comprises at least one of a manufacturing facility, a shopping mall, a warehouse, an airport facility, a hospital facility, a university campus facility or an at least partially enclosed building.

9. A server computing system for magnetic fingerprinting of an indoor area, the server computing system comprising:
    a processor; and
    a memory including instructions executable in the processor to:
    generate a magnetic infrastructure profile of at least a portion of the indoor area wherein generating the magnetic infrastructure profile comprises identifying a set of polygons corresponding to potential magnetic field interference sources, based on a floorplan of the indoor area;
    determine, in the processor, a magnetic field profile based on the magnetic infrastructure profile, wherein the magnetic field profile is determined based on a postulated magnetic model, and wherein determining the magnetic field profile comprises:
    classifying each of the set of polygons, based on a magnetic potential of a type of magnetic field interference source corresponding to a polygon; and
    assigning, based on the type of the magnetic interference source, default initial values to magnetic field profile parameters of each of the set of polygons, the default initial values being based on the postulated magnetic model; and
    generate an association of the magnetic field profile parameters associated with respective locations within the indoor area as the magnetic fingerprint map.

10. The system of claim 9 wherein the magnetic infrastructure profile comprises at least one of a wall, a support column, an elevator, a fixedly located electronic equipment, a support beam, a stairwell, an escalator, a ceiling, and an electro-mechanical power plant.

11. The system of claim 9 wherein the magnetic infrastructure profile comprises at least one of a steel structural element and a ferro-magnetic structural element.

12. The system of claim 9 wherein the postulated mathematical magnetic model includes at least a lengthy ferromagnetic element (LFME).

13. The system of claim 9 wherein the magnetic field profile parameters comprise at least one of a magnetic field strength and a magnetic dip angle.

14. The system of claim 9 wherein the magnetic field parameters comprise at least one of an x, y, z magnetic field vector component.

15. The system of claim 9 wherein the magnetic field parameters comprise a magnetic direction.

16. The system of claim 9 wherein the indoor area comprises at least one of a manufacturing facility, a shopping mall, a warehouse, an airport facility, a hospital facility, a university campus facility or an at least partially enclosed building.

17. The method of claim 1, wherein determining the magnetic field profile further comprises refining the default initial values of the magnetic field profile parameters to generate the magnetic field profile.

18. The method of claim 1, wherein determining the magnetic field profile further comprises
- georeferencing the floor plan, to determine geolocation of endpoints of each line representing an LFME;
- estimating an angle that the LFME makes with the geomagnetic field, based on the georeferencing;
- estimating a length of the LFME, based on the georeferencing; and
- determining the magnetic field parameters for the geolocation, based on the estimated angle and the estimated length of the LFME.

19. The system of claim 9, wherein determining the magnetic field profile further comprises refining the default initial values of the magnetic field profile parameters to generate the magnetic field profile.

20. The system of claim 9, wherein determining the magnetic field profile further comprises
- georeferencing the floor plan, to determine geolocation of endpoints of each line representing an LFME;
- estimating an angle that the LFME makes with the geomagnetic field, based on the georeferencing;
- estimating a length of the LFME, based on the georeferencing; and
- determining the magnetic field parameters for the geolocation, based on the estimated angle and the estimated length of the LFME.

* * * * *